J. L. GARVER.
SHAFT DETACHER FOR VEHICLES.
APPLICATION FILED MAR. 29, 1912.
1,075,821.
Patented Oct. 14, 1913.
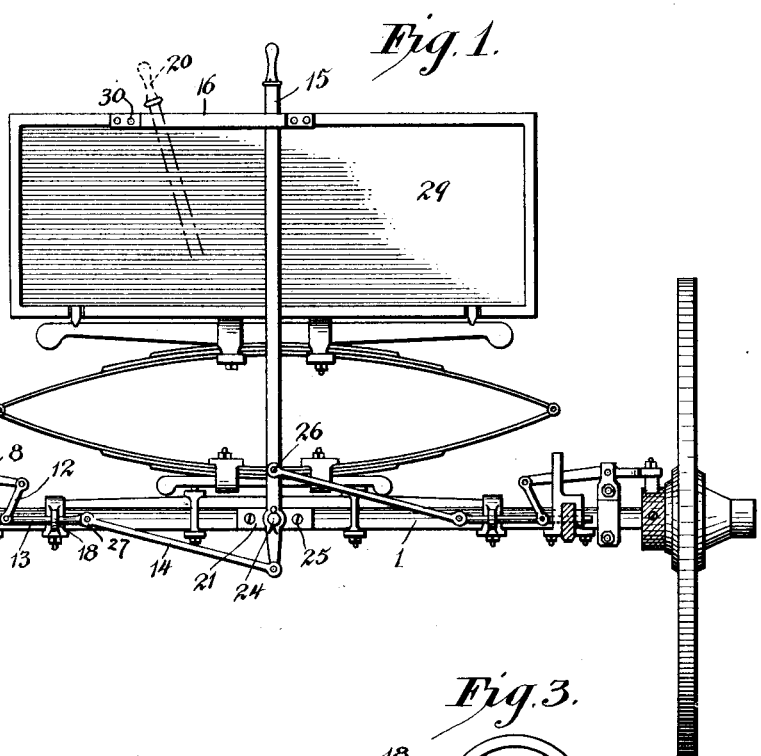

UNITED STATES PATENT OFFICE.

JAMES L. GARVER, OF WICHITA, KANSAS.

SHAFT-DETACHER FOR VEHICLES.

1,075,821.  Specification of Letters Patent.  Patented Oct. 14, 1913.

Application filed March 29, 1912. Serial No. 687,260.

*To all whom it may concern:*

Be it known that I, JAMES L. GARVER, a citizen of the United States, residing at Wichita, in the county of Sedgwick and State of Kansas, have invented certain new and useful Improvements in Shaft-Detachers for Vehicles; and I do hereby declare the following to be a full, clear, and exact description of the invention, such as will enable others skilled in the art to which it appertains to make and use the same.

My invention relates to an improved shaft detaching device for vehicles, and the object thereof is to provide an efficient means for instantaneously releasing a runaway horse from a vehicle. The device further acts as a means for attaching the shafts or pole to the vehicle.

The invention comprehends the construction and assembling of parts to be hereinafter described in the specification, illustrated in the accompanying drawing and succinctly defined in the appended claims.

Figure 1, is a front elevation of a vehicle showing my device attached thereto. Figs. 2 and 3, improved axle clips. Fig. 4, a brake shoe. Fig. 5, a plan view of the catch and keeper.

Referring to the drawings, 1, indicates a vehicle axle on which are wheels 2, on the hubs of which are corrugated bands 3, said bands are of a size to fit closely over the wheel hubs and secured thereon by screws 4. The shaft-clip 9 (best shown in Fig. 2) is made with an upward extending arm 8, in which is a rectangular opening 11. Adjacent thereto is another clip 18, having a lug which is perpendicular to the aforesaid axle and having a hole 22, therein. A rod 13, is mounted in the holes 22 and 23 and is slidable therein. A plate 21, having a perpendicular pintle 24, is affixed to the axle 1, with screws or bolts 25. A lever 15, is pivotally positioned on the said pintle and retained thereon with a cotter-pin. Equidistant from said pintle are links 14 pivotally connected to said lever as at 26. The other end of said links are pivoted to the rod 13, as at 27. Bars 6, are affixed to the axle aforesaid with clips 7, and to the top ends of which are pivoted as at 28, brakes 5, and to the outer ends are bolted circular shoes 19 (best seen at Fig. 4) the circle being of a curve to properly fit the corrugated bands 3. The inner ends of said brakes pass through the rectangular openings 11, in the extension 8, and are somewhat downwardly inclined from the pivot 28, and a pivoted link 12, connects their free ends to the rods 13. Affixed to the dashboard 29 is a curved catch 17 and a keeper 16 adapted to hold the lever in the desired position.

Having described the construction and assembling of my machine I will now describe its *modus operandi*.

When I desire to attach the shafts or pole, the lever 15, is shifted to the position shown by the dotted lines 20, which draws the outer ends of the rods 13, out of the clips 9, and the shafts 10, are placed in the clips and the lever 15, is then thrown back to its normal position and the incline 31, springs the lever forward so that when it strikes the keeper 16, it drops back behind the catch 17, and is thereby secured against displacement and thereby positively retains the rods 13 in the clips 9, and the shafts 10. When it is desired to release a runaway horse from a vehicle, the lever 15, is pushed forward against the keeper 16, then shifted laterally to the position indicated by the dotted lines 20 which draws the free ends of the rods 13, out of the clips and thereby releases the shafts or pole. Meantime the links 12, have pushed the inner ends of the brake up and brought the shoes 19, in contact with the corrugated bands 3, and thereby lock the wheels and stops the vehicle.

What I claim is:

1. In a shaft detacher for vehicles, a plate having a pintle perpendicular thereto, and affixed to the vehicle axle, a lever, said lever pivotally positioned on said pintle and means to hold the upper end thereof in the desired position, links pivotally affixed to said lever equidistant from the aforesaid pintle, slidable rods, said rods pivotally connected to said links which rods pivotally connect the shaft to the vehicle, and upon shifting of the aforesaid lever are withdrawn to detach the shaft from said vehicle, an axle clip having a lateral lug, said lug being provided with a hole in which are placed slidable rods aforesaid; a bar, a brake lever, pivotally connected thereto, a vertical clip extension, having a slot therein to receive one end of said brake lever and to allow it to play up and down therein and to provide against lateral movement and a shoe affixed to said lever to contact the wheel hub upon movement of the lever, links pivotally connecting said brake lever to the aforesaid slidable rod so that upon shifting the first mentioned lever the slidable rod is withdrawn from the shaft and the shoe made to contact the wheel hubs and stop the vehicle.

2. In a shaft detacher for vehicles, a plate having a pintle perpendicular thereto and affixed to the axle, a lever pivotally positioned on said pintle, an axle clip having a lateral lug with a hole therein, an upward extension on said clip, said extension having a vertical rectangular opening therein, a second clip having a lateral lug and a hole in said lug, a slidable rod positioned in the holes of said clips and a link pivotally connecting said rod to the lever aforesaid and means for locking said lever in a normal position, a member affixed to the vehicle axle, a brake pivoted thereto and extending through the aforesaid rectangular opening and a link pivotally connecting the brake and the slidable rod, corrugated bands affixed to the hubs of the vehicle wheels and means for continuously holding said brake in contact with the corrugated bands.

In testimony whereof, I have signed this specification in the presence of two subscribing witnesses.

JAMES L. GARVER.

Witnesses:
G. E. HALL,
M. LAWRENCE.

Copies of this patent may be obtained for five cents each, by addressing the "Commissioner of Patents, Washington, D. C."